(12) United States Patent
Wippersteg et al.

(10) Patent No.: US 8,204,960 B2
(45) Date of Patent: Jun. 19, 2012

(54) ELECTRONIC DATA EXCHANGE SYSTEM AND METHOD

(75) Inventors: Heinz-Hermann Wippersteg, Buende (DE); Thilo Steckel, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1156 days.

(21) Appl. No.: 11/216,219

(22) Filed: Aug. 31, 2005

(65) Prior Publication Data

US 2007/0073700 A1    Mar. 29, 2007

(30) Foreign Application Priority Data

Sep. 3, 2004   (DE) .......................... 10 2004 043 169

(51) Int. Cl.
*G06F 15/16*    (2006.01)
(52) U.S. Cl. ................ 709/218; 701/1; 701/24; 701/25; 701/50
(58) Field of Classification Search .................. 709/218; 701/50, 24–25, 1
See application file for complete search history.

(56) References Cited

U.S. PATENT DOCUMENTS

| | | | |
|---|---|---|---|
| 5,712,782 A | | 1/1998 | Weigelt et al. |
| 5,884,224 A | * | 3/1999 | McNabb et al. .................. 702/2 |
| 6,141,614 A | * | 10/2000 | Janzen et al. .................. 701/50 |
| 6,167,337 A | * | 12/2000 | Haack et al. .................... 701/50 |
| 7,415,324 B2 | * | 8/2008 | Healy ............................... 701/1 |
| 2001/0037182 A1 | * | 11/2001 | Hall et al. ...................... 702/104 |
| 2002/0133505 A1 | * | 9/2002 | Kuji ........................... 707/104.1 |
| 2003/0041130 A1 | | 2/2003 | Harrisville-Wolff et al. |
| 2003/0139968 A1 | | 7/2003 | Ebert |
| 2004/0122894 A1 | | 6/2004 | Wippersteg |
| 2005/0024213 A1 | * | 2/2005 | Franzen et al. ............... 340/600 |
| 2006/0030990 A1 | * | 2/2006 | Anderson et al. .............. 701/50 |

FOREIGN PATENT DOCUMENTS

| | | |
|---|---|---|
| DE | 43 22 293 A1 | 1/1995 |
| DE | 195 14 223 A1 | 10/1996 |
| DE | 102 45 169 A1 | 4/2004 |
| WO | 02/51194 A1 | 6/2002 |

* cited by examiner

*Primary Examiner* — Duyen Doan
(74) *Attorney, Agent, or Firm* — Michael J. Striker

(57) ABSTRACT

In a system and a method of electronic data exchange for retrieving information used to carry out processes, at least one application is used to retrieve the information, and the application retrieves situation-specific information.

17 Claims, 3 Drawing Sheets

ELECTRONIC DATA EXCHANGE SYSTEM AND METHOD

BACKGROUND OF THE INVENTION

Cross-Reference to Related Application

The invention described and claimed hereinbelow is also described in German Patent Application DE 10 2004 043 169.8, filed on Sep. 3, 2004, which German Patent Application provides the basis for a claim of priority of the invention under 35 USC §119 (a)-(d).

The present invention relates to a system and a method based on electronic data exchange.

Publication DE 102 45 169 makes known a communication system based on electronic data exchange with which a large number of users and service providers communicate with each other. The communication is designed such that the user or users generate special questions, e.g., to optimize operating parameters of an agricultural harvesting machine, which are subsequently received and answered by service providers via a communication system. The various service providers automatically recognize the questions covered by their scope of services, thereby ensuring that the operator of the agricultural working machine need only generate the questions that concern him. A targeted search for a suitable service provider or the automatic retrieval of the required information are completely eliminated by the use of a communication system of this type. In addition, the service providers are structured such that they avail themselves of other service providers to answer the questions generated, so that, as a result of this information retrieval process, the service provider(s) provide information, e.g., to the operator of an agricultural working machine, that is tailored precisely to the operator's needs.

An information retrieval system designed in this manner requires a minimum amount of technical knowledge on the part of the user, since the user must generate questions that reflect the information he requires. This requires comprehensive knowledge of the particular process to be optimized. Due to the fact that agricultural working machines are increasingly used by multiple operations and are provided by "contractors", the problem results that the operators of the agricultural working machines must often use different agricultural working machines, which means they do not have special knowledge of the particular machine type or the interrelationships between the operating parameters of the agricultural working machine, crop parameters, and external basic conditions such as the slope of hilly terrain, temperature and humidity.

SUMMARY OF THE INVENTION

The object of the present invention, therefore, is to propose a system and a method based on electronic data exchange that avoids the described disadvantages of the related art and, in particular, enables a process organization that is largely independent of the knowledge and experience of a user who is organizing a process.

In keeping with these objects and with others which will become apparent hereinafter, one feature of the present invention resides, briefly stated, in a system of electronic data exchange for retrieving information used to carry out processes, the system comprising at least one application for retrieving the information, said at least one application being formed so that it retrieves situation-specific information.

Another feature of the present invention resides, briefly stated, in a method of electronic data exchange for retrieving information used to carryout processes, comprising the steps of retrieving the information using at least one application; and performing the retrieving so that the application retrieves situation-specific information.

Due to the fact that information required to carry out processes is retrieved using at least one application that retrieves situation-specific information, the user of the information retrieval system is largely relieved of the task of qualifying the retrieval of information.

In an advantageous further development of the present invention, the application is designed such that it determines the information requirement itself. This has the advantage, in particular, that the information requirement can be determined to very quickly optimize or organize processes. In addition, a system of this type has the advantage that, for optimization purposes, information can be linked in a manner that a user would not be able to do at all or only with considerable effort.

An information retrieval system of this type is made highly efficient when the application automatically retrieves the information that fulfills the information requirement.

A particularly efficient mode of operation of the application that retrieves the information is created when the application itself identifies a suitable service provider for providing the information required, the service provider makes the information available to the application, and the application further processes this information that was provided.

In an advantageous further development of the present invention, to ensure that the data exchange between the users' applications and the service providers can take place smoothly and independently of special data formats, the communication between the users' applications and the service providers is based on standardized Web techniques.

In an advantageous embodiment, to keep the amount of data to be exchanged between the users' and service providers' applications to a minimum to ensure that process sequences are carried out quickly, the information to be retrieved is limited to process and planning data, which can also be reduced to supplementary process and planning data, depending on the information requirement.

To shorten the search for suitable service providers, the communication can be designed in an advantageous further development of the present invention such that the application retrieves the information determined to fulfill the information requirement from a predefined number of service providers. To increase the quality of the information to be retrieved, or with consideration for the retrieval costs incurred, the application can also be configured such that it automatically integrates additional suitable service providers in the communication.

To carry out repetitive process sequences, the application can also be designed such that it dynamically checks the information available or that has already been retrieved for these processes and, if necessary, retrieves new, updated information.

In an advantageous further development of the present invention, the application can also be designed such that it makes the generated processes or process sequences available to additional users, and/or integrates additional users into the system for information retrieval. The latter approach has the advantage, in particular, that the same information does not have to be retrieved more than once, which is often the case when setting the operating parameters of agricultural working machines.

Due to the complex dependencies that exist in agricultural applications, a particularly advantageous embodiment of the present invention results when the application is assigned to mobile and/or stationary agricultural equipment, and the information retrieved controls agricultural processes. A particularly efficient embodiment results in this context when the agricultural process includes the optimization of operating parameters of agricultural working machines, management of the implementation of agricultural working machines, management of complex process sequences, and/or optimization of the use of auxiliary substances.

Considerable financial advantages to the user of the application can result when the application is used to optimize the use of seeds, fertilizer and plant-protecting agents, and to optimize fuel use.

To ensure that the application is activated only when needed and does not permanently retrieve and provide information, it can be provided that the user must first activate the application. In the simplest case, this can take place as follows: The user selects a process to be carried out, and the application determines what information is required to carry out the preselected process and automatically retrieves the information determined to fulfill the information requirement.

In a further advantageous embodiment of the present invention, the data exchange system itself can be a user of the application according to the present invention for retrieving situation-specific information for modulated sequences. This has the advantage in particular that globally-acting structures can therefore be optimized. In this case, the data exchange system that is the user functions as a process-chain manager, the process chain consisting, e.g., of a modulated sequence formed of a large number of process chains.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
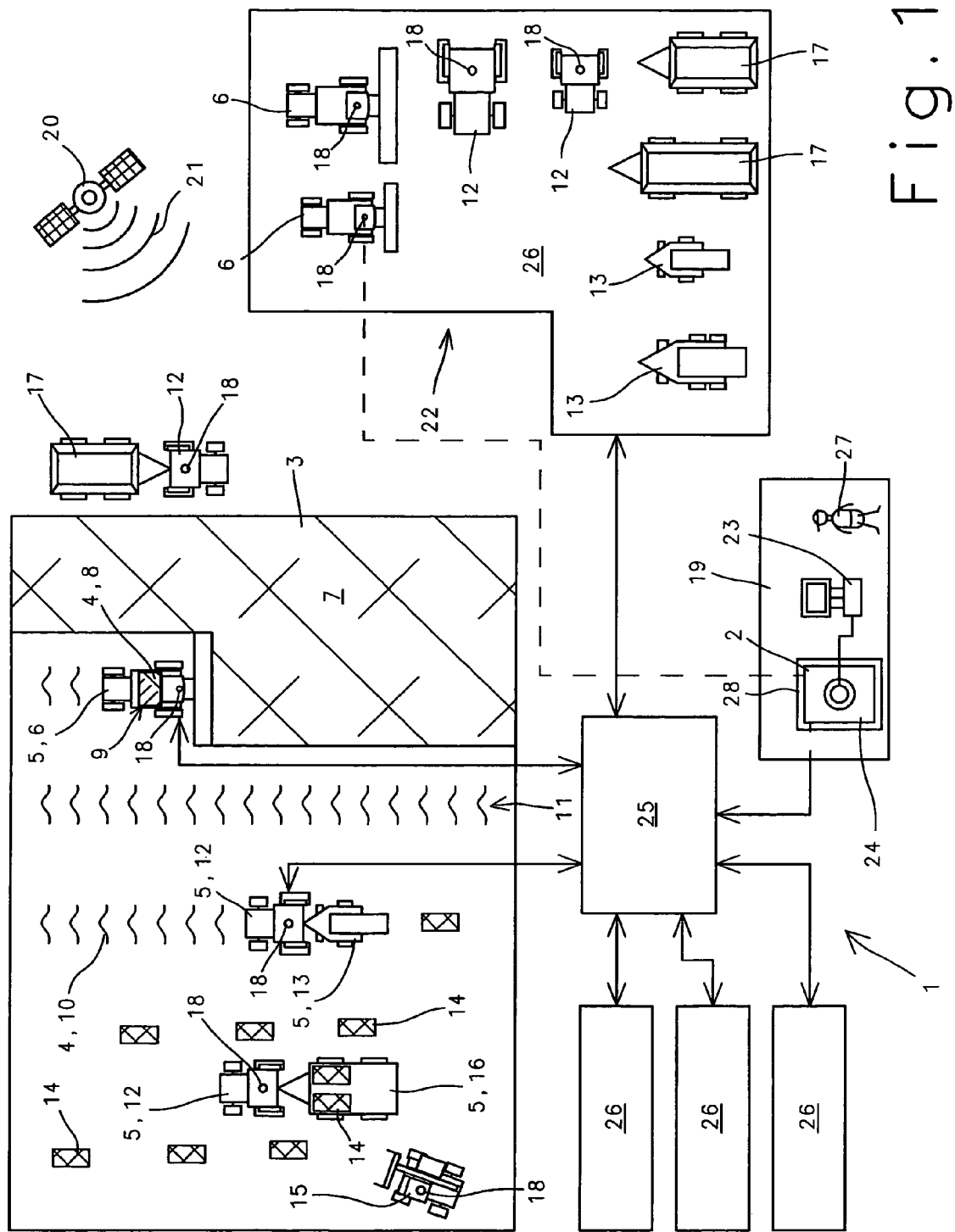
FIG. 1 shows a schematic illustration of the data exchange system according to the present invention.

FIG. 1 is a schematic illustration of information retrieval system 1 based on electronic data exchange using the example of an agricultural application, namely the planning of process chain 2—harvesting a cultivated field 3 and recovering crops 4. Process chain 2 is usually carried out such that one or more agricultural working machines 5 designed as combine harvesters 6 first harvest stand 7 growing on a cultivated field 3. In the exemplary embodiment shown, the part of crops 4 that is fruit 8 is stored for the interim on combine harvester 6 in a "grain tank", while the remaining part of crops 4, namely straw 10, is deposited in swaths 11 on cultivated field 3.

Once straw deposited in swaths 11 reaches a moisture content that permits straw 10 to be stored, a bale press 13 pulled by tractor 12 presses straw 10 into crop bales 14, which are deposited onto cultivated field 3. In a further working step in process chain 2, crop bales 14 are loaded, e.g. using a "stacker truck" 15, onto flatbed trailers 16 pulled by tractors 12 and are hauled away for storage. In a similar manner, fruit 4 stored for the interim in grain tank 9 is loaded onto hauling trailers 17 pulled by tractors and hauled away for storage or further processing. Modern agricultural working machines 5 also include transmitter/receiver units 18, by way of which they can communicate with other agricultural working machines 5 and/or stationary equipment 19 in a manner to be described in greater detail below, the transmitter/receiver units 18 usually also receiving satellite-generated GPS signals 21 which are then used, e.g., to generate position data related to particular agricultural working machine 5.

FIG. 1 also shows a vehicle pool 22 which includes, in this case, e.g., a large number of combine harvesters 6, tractors 12, bale presses 13 and hauling trailers 17, which can all differ from each other in terms of performance class and manufacturer. In the simplest case, the only difference is that there are large, higher-performance series, and small, lower-performance series.

Schematically shown stationary equipment 19 includes a central arithmetic unit 23. Application 24 according to the present invention is assigned to central arithmetic unit 23 in a manner to be described in greater detail below. Application 24 according to the present invention can communicate via a data exchange system 25, e.g., the Internet, with highly diverse types of agricultural working machines 5, highly diverse types of service providers 26, and a vehicle pool 22, which could be vehicle pool 22 belonging to a contractor.

Figure 2:
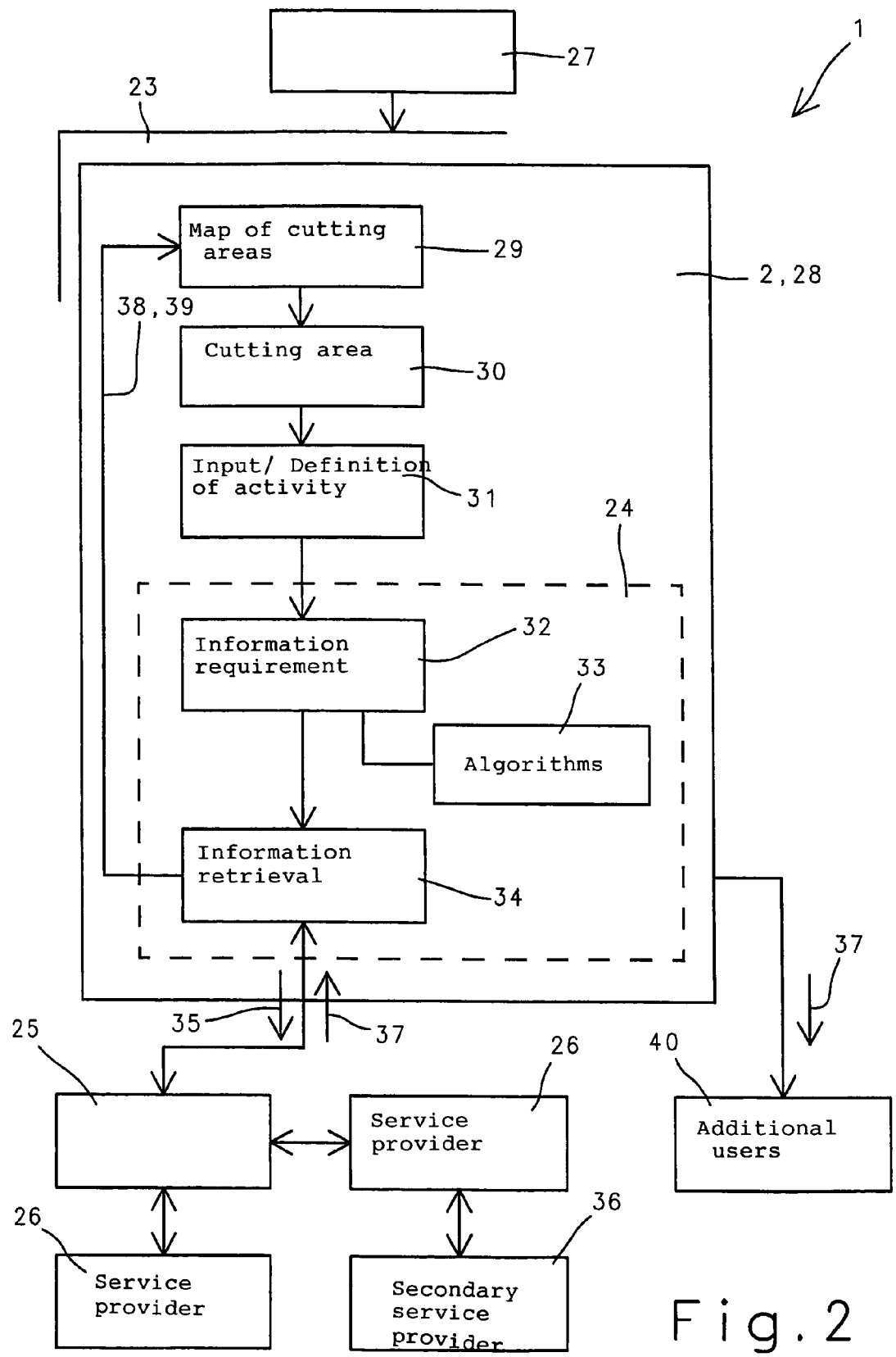
FIG. 2 shows a flow chart of information retrieval according to the present invention.

To plan and organize the implementation of combine harvesters 6, bale presses 13 and recovery vehicles 12, 15-17 for working a cultivated field 3, a user 27 can use application 24 according to the present invention in a manner such that he first activates a procedure 28 in an arithmetic unit 23, procedure 28 corresponding to process chain 2—harvesting and recovery—shown. Activated procedure 28 is coupled with application 24 according to the present invention. According to FIG. 2, procedure 28 that plans process chain 2—harvesting and recovery—can be activated as follows: User 27 activates map of cutting areas 29 in arithmetic unit 23 and, in map of cutting areas 29, navigates to cutting area 30 that is cultivated field 3 to be worked. In a further method step 31, user 27 can be prompted to define the activities to be carried out on selected cutting area 30. In the exemplary embodiment according to FIG. 1, which will be referred to repeatedly below, this includes harvesting the grain and recovering crops 4, namely the kernels and straw in this case.

When these definitions are completed, application 24 according to the present invention can be activated either automatically or by user 27. In an initial method step, activated application 24 checks information requirement 32 needed to plan particular process chain 2. This can take place, e.g., in that, in method step 32, the information already stored in map of cutting areas 29 is detected by application 24 according to the present invention. Depending on particular process chain 2 to be planned, algorithms 33 can be assigned to application 24, the algorithms defining the necessary information and/or a selection of possible process chain-specific information. Due to the fact that application 24 compares the information already stored in map of cutting areas 29 with the process chain-specific information defined by stated algorithms 33, application 24 generates information requirement 32 for process chain 2, 28 to be carried out. In the simplest case, identified information requirement 32 includes situation-specific process and planning data or, if situation-specific process and planning data 38 are already available, identified information requirement 32 can also be limited to supplementary process and planning data 38.

In a further method step, application 24 according to the present invention automatically initiates information retrieval 34. This can take place, e.g., in that questions 35 which encode identified information requirement 32 are transmitted to a data exchange system 25, "service providers" 26 being integrated in data exchange system 25, the service of whom includes, e.g., the retrieval of specific information, which is described in greater detail below. With regard for service providers 26, data exchange system 25 can be structured such that only a very certain selection of defined service providers 26 are integrated in data exchange system 25 and are capable of being contacted by application 24 according to the present invention.

It lies within the scope of the present invention, however, that the integration of service providers 26 is capable of being expanded at random and dynamically, this being achieved, e.g., by application 24 according to the present invention controlling this dynamic integration of service providers 26 as a function of process chain 2 to be planned. It is also possible for service providers 26 integrated in data exchange system 25 to communicate with "secondary service providers" 36 to retrieve information. Depending on the structuring of questions 35 transmitted by application 24 to data exchange system 25, the questions can either be transmitted to certain service providers 26 in a defined manner, or particular service provider 26 automatically recognizes question 35 to be addressed by his service and forwards it for processing.

After questions 35 transmitted to data exchange system 25 have been handled by particular service provider 26, 36, results data 37 are transmitted to application 24 according to the present invention via data exchange system 25 and are processed further into information 39 which is the determined information requirement 32. According to the exemplary embodiment shown, information 39 is process and planning data 38, which are then transmitted to activated map of cutting areas 29 for planning processes 2 to be described in greater detail below. To ensure that communication between application 24 according to the present invention and various service providers 26, 36 takes place without a problem, the communication taking place in data exchange system 25 is based, in the simplest case, on standardized "Web" techniques. In an advantageous further development of the present invention, application 24 can also be structured such that it dynamically checks information requirement 32 of a procedure 28 that plans a process chain 2, recognizes required data to be updated as information requirement 32, and automatically retrieves it in a manner according to the present invention using data exchange system 25.

As described above, FIG. 1 is a schematic depiction of the planning of process chain of harvesting—recovery 2 with the aid of application 24 according to the present invention. A user 27 activates process chain 2 defined in a procedure 28 stored in an arithmetic unit 23—a "map of cutting areas" 29 in this case—within which it navigates to cutting area 30 which is cultivated field 3 to be worked. Information already stored in arithmetic unit 23 can be assigned to cutting area 30. Possibilities here include, in particular, information regarding the owner of the cutting area, and possibly his address and the size and location of the cutting area. It is also within the scope of the present invention, however, that any type of information that is of interest for carrying out a certain procedure 28 can be stored in arithmetic unit 23 in advance. For example, this could also be information regarding a fixed machine inventory of a vehicle pool 22.

To make process chain 2 to be planned more specific, user 27 is prompted in a further method step 31 to enter data to describe process chain 2. In the current case, the definition would be limited to harvesting using combine harvester 6 and recovery of kernels 8 and straw 10 using bale presses 13 and hauling and loading capacities 12, 15-17.

After this input is completed, application 24 according to the present invention is activated, and application 24 first determines—in a manner described above—information requirement 32 for carrying out activated process chain 2. In the current case, this mainly includes defining agricultural working machines 5 to be implemented. To this end, application 24 can connect via data exchange system 25 with a service provider 26 who operates, as a contractor, a vehicle pool 22 of highly diverse agricultural working machines 5. In this context, question 35 generated by application 24 includes the request for suitable combine harvesters 6, bale presses 13, flatbed and hauling trailers 16, 17, and the number of tractors 12 required.

With regard for the selection of agricultural working machines 5, application 24 can compile an optimized selection of available combine harvesters 6, e.g., with consideration for the ground relief stored in map of cutting areas 29 and the geometry and size of cutting area 30 to be harvested. For example, if work must be performed on a sloped landscape, "hill side combine harvesters" 6 can be used, the working components of which can level the tilted position—which depends on the slope—of combine harvester 6. With regard for the geometry and size of cutting area 30, it must be ensured that the capability of the selected machines is appropriate for the size of the cutting area, and that the maneuverability of the selected machines is appropriate for the geometric conditions of cutting area 30.

If the machine has inadequate capabilities, the harvesting operation takes longer to complete. If the machine has more capability than necessary, selected combine harvesters 6 are not used in an economical manner. Application 24 is structured, according to the present invention, such that it determines—with consideration for these interrelationships—the requirement on combine harvesters 6 and, using data exchange system 25, determines via service providers 26 the scope of combine harvesters 6. It is feasible that required combine harvesters 6 are provided by a single contractor who operates a vehicle pool 22, or jointly by a large number of contractors.

To further optimize the machine pool to be compiled, either application 24 itself or particular integrated service provider 26 can define further criteria for optimization and retrieve the information required therefor. Based on the exemplary embodiment shown, this can be the retrieval of the soil moisture of cutting area 30 to be worked, so that the driveability of cutting area 30 and the resultant traction force are also taken into account when compiling the machine pool. In fact, it is even possible to retrieve tire pressure recommendations from suitable service providers 26 using data exchange system 25 when compiling the machine pool based on the perspective of optimal ground pressures, the tire pressure recommendations being tailored to the particular vehicle tires used.

Furthermore, application 24 or particular service provider 26 that was contacted can be structured such that, with consideration for the specifics of cutting area 30 to be worked, and crop properties and climate conditions, they retrieve machine-specific setting parameters as results data 37, the results data 37 enabling an optimum adjustment of the highly diverse working components of the selected agricultural working machines for the particular harvesting and working conditions. Furthermore, results data 37 provided can include an optimization of the simultaneous or consecutive implementation of the selected machine pool in terms of time.

This has the advantage, in particular, that the logistics of the harvesting process can be optimized in this manner. Due to the fact that results data 37 also includes the interplay of a plurality of agricultural working machines 5 within one or more process chains 2, results data 37 are simultaneously process and planning data 38 that can be used to plan and optimize entire process sequences in advance. This has the advantage, in particular, that the time spent idling, waiting and setting-up can be minimized before working sequences are carried out, to ensure high economic and operational efficiency. Since the determined process and planning data 38 are available to additional users 40 integrated in a process chain 2—who can also be the drivers of highly diverse agricultural working machines 5—application 24 according to the present invention can also be structured such that it transfers determined process and planning data 38 to additional users 40 and/or automatically integrates additional users 40 in data exchange system 25. Now that widespread communication is possible between highly diverse users 27, 40 and service providers 26 in a data exchange system 25, application 24 according to the present invention can be stored and operated on highly diverse mobile devices 5 and in central stationary equipment 19.

In a manner not shown, process chain 2 to be optimized using application 24 according to the present invention can also include the optimization of the use of "auxiliary substances", such as fertilizer and plant-protecting agents, seeds, and fuel consumption.

To ensure that the optimization of certain process sequences is carried out only when necessary, user 27, 39 must start procedure 28 that includes application 24 according to the present invention. It is also possible, however, that particular procedure 28 is activated automatically. This is particularly significant when optimizing the setting parameters of the working components of an agricultural working machine 5, since they can fluctuate regularly to a great extent as a function of crop properties and weather conditions, and the operator of agricultural working machine 4 cannot always determine these fluctuations himself.

Figure 3:
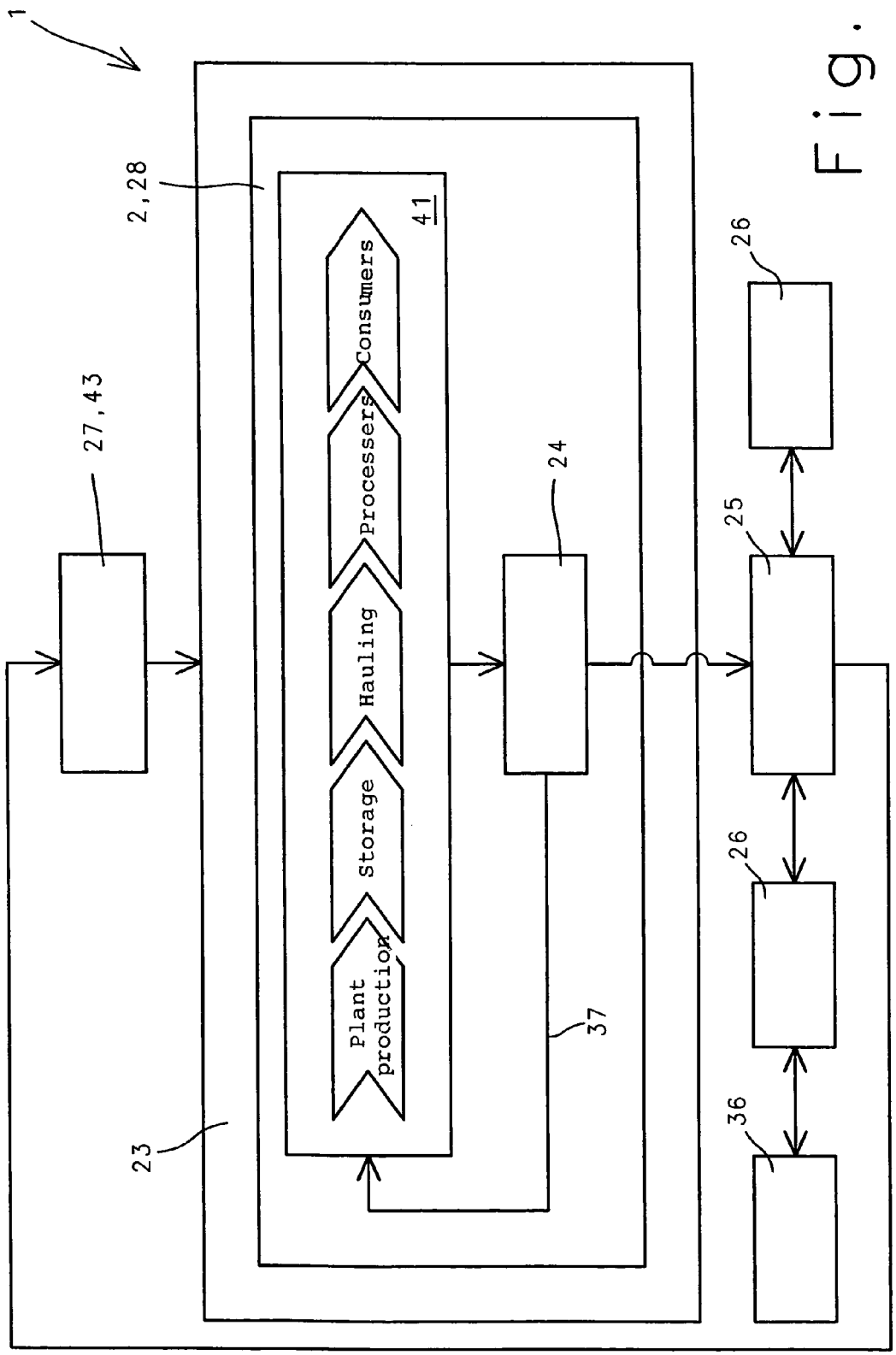
FIG. 3 shows a further flow chart of a global application of the information retrieval system according to the present invention.

According to FIG. 3, information retrieval system 1 according to the present invention can also be designed such that process chain 2—which is controllable using a procedure 28—is a modulated sequence 41 that can be composed of a large number of individual process chains 42. Modulated sequence 41—which can also be referred to as a global process chain 2—is actively connected with application 24 according to the present invention, application 24 determining information requirement 32 of modulated sequence 41 in the manner described above and retrieving the required results data 37. The retrieval of results data 37 takes place in a similar manner via data exchange system 25 and service providers 26 that were contacted or will be contacted, and secondary service providers 36 assigned thereto.

Due to the fact that modulated sequence 41 includes, e.g., separate process chains 42 of plant production-storage-transport-processing-consumer, the complete cycle of agricultural production processes is depicted using a global process chain 2, 41 structured in this manner. To ensure that this comprehensive process can be optimized effectively using application 24 according to the present invention, data exchange system 25 can even be user 27 of information retrieval system 1. This can be achieved in the simplest manner possible by data exchange system, e.g., the Internet, taking on the function of a global process-chain manager 43 and, in this virtual function, acting as the user of application 24 according to the present invention to optimize global process chain 41.

One skilled in the art is capable of transforming data exchange system 25 described in a manner not described, or using it in applications other than those shown here to obtain the effects described, without leaving the scope of the invention.

It will be understood that each of the elements described above, or two or more together, may also find a useful application in other types of constructions and methods differing from the types described above.

While the invention has been illustrated and described as embodied in an electronic data exchange system and method, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:

1. An electronic data exchange system configured for retrieving information used to carry out processes, the system comprising:

a computer with a central arithmetic unit and a memory, and which is configured as a central processing unit within which at least one application executes the following steps:

automatically determining a situation-specific information requirement for at least one of said processes, wherein the determined situation-specific information requirement includes situation-specific process and planning data or if situation-specific process and planning data are already available, the determined situation-specific information requirement includes supplementary process and planning data;

automatically identifying a suitable service provider of the situation-specific information requirement, from a plurality of service providers integrated into the data exchange system;

automatically integrating additional suitable service providers into the data exchange system, at random and dynamically;

automatically retrieving situation-specific information for the situation-specific information requirement from the identified suitable service provider and any additional suitable service providers through communications between the application and the service providers is based on standardized Web techniques;

automatically processing the retrieved situation-specific information to automatically carry out said at least one process, including dynamically checking existing situation-specific information for new, updated situation-specific information and automatically retrieving said new, updated situation-specific information where available;

wherein said application is assigned to an apparatus selected from the group consisting of at least one mobile agricultural working machine, at least one piece of stationary equipment, or both, and the situation specific information controls agricultural processes;

wherein the agricultural processes can be selected from the group consisting of an optimization of operational parameters of the agricultural working machine, a management of an implementation of the agricultural working machine, a management of complex processes sequences, an optimization of a use of auxiliary substances and combinations thereof.

2. A system as defined in claim 1, further comprising means for communicating between said application, system users and providers.

3. A system as defined in claim 1, wherein said system further comprises means for performing a data exchange using standardized Web techniques.

4. A system as defined in claim 1, wherein said situation-specific information includes process and planning data, which process and planning data are limitable to supplementary process and planning data.

5. A system as defined in claim 1, further comprising a step of navigating among a grid-upon service provider.

6. A system as defined in claim 2, further comprising steps of integrating additional users in the system, and making the retrieved information available to said additional users.

7. A system as defined in claim 1, wherein said auxiliary substances include seeds, fertilizers, plant-protecting agents, and fuels.

8. A system as defined in claim 2, further comprising a step wherein said application is activated by a user.

9. A system as defined in claim 8, wherein said user is a data exchange system, and wherein said application makes the situation-specific information available to a modulated sequence.

10. A system as defined in claim 9, wherein the modulated sequence comprises a large number of process chains.

11. A system as defined in claim 9, further comprising means for implementing process-chain managing of the modulated sequence.

12. A system as defined in claim 1, further comprising a step wherein a user selects a defined process, and at least one of said steps of determining, identifying, retrieving and processing are carried out to fulfill the information requirement.

13. A method of electronic data exchange operable in a computer having a central arithmetic unit and a memory for retrieving information used to carryout processes, comprising the steps of:

initiating a process by a system user;

automatically determining whether the process requires situation-specific information, using at least one application, wherein the determined situation-specific information requirement includes situation-specific process and planning data or, if situation-specific process and planning data are already available, that the determined situation-specific information requirement includes supplementary process and planning data;

if situation-specific information is required, automatically identifying a suitable service provider of the required situation-specific information from a plurality of service providers integrated into the data exchange system, using said at least one application;

automatically integrating additional suitable service providers into the data exchange system, at random and dynamically, using said at least one application;

automatically retrieving the required situation-specific information from said suitable service provider and any additional suitable service providers, using communications between the application and the service providers that are based on standardized Web techniques; and automatically processing the retrieved, required situation-specific information, using said at least one application, to carry out said process, including dynamically checking existing situation-specific information for new, updated situation-specific information and automatically retrieving said new, updated situation-specific information where available;

wherein said application is assigned to an apparatus selected from the group consisting of at least one mobile agricultural working machine, at least one piece of stationary equipment, or both, and the situation specific information controls agricultural processes;

wherein the agricultural processes can be selected from the group consisting of an optimization of operational parameters of the agricultural working machine, a management of an implementation of the agricultural working machine, a management of complex processes sequences, an optimization of a use of auxiliary substances and combinations thereof.

14. A method as defined by claim 13, further comprising a step of automatically receiving updated situation-specific information for said process as it becomes available.

15. A method as set forth in claim 13, wherein said step of initiating further comprises communicating between said user and said application over the Internet.

16. A method as set forth in claim 15, wherein said communicating comprises wireless communication.

17. An electronic data exchange system comprising a central processing unit within which an application configured for retrieving information used to carry out processes, the central processing unit comprising:

application program means for determining a situation-specific information requirement for at least one of said processes, wherein the determined situation-specific information requirement includes situation-specific process and planning data or, if situation-specific process and planning data are already available, that the determined situation-specific information requirement includes supplementary process and planning data;

application program means for identifying a suitable service provider of the situation-specific information requirement from a plurality of service providers integrated into the data exchange system;

automatically integrating additional suitable service providers, into the data exchange system, at random and dynamically;

application program means for retrieving situation-specific information for the situation-specific information requirement from the identified suitable service provider, and any additional suitable service providers using communications between the application and the service providers that are based on standardized Web techniques;

application program means for processing the retrieved situation-specific information to automatically carry out said at least one process, including dynamically checking existing information for new, updated information and automatically retrieving said new, updated situation-specific information where available; and application program means for receiving updated situation-specific information for said at least one process, automatically as it becomes available, and for automatically processing said updated situation-specific information to automatically carry out said at least one process;

wherein said application is assigned to an apparatus selected from the group consisting of at least one mobile agricultural working machine, at least one piece of stationary equipment, or both, and the situation specific information controls agricultural processes;

wherein the agricultural processes can be selected from the group consisting of an optimization of operational parameters of the agricultural working machine, a management of an implementation of the agricultural working machine, a management of complex processes sequences, an optimization of a use of auxiliary substances and combinations thereof.

\* \* \* \* \*